Oct. 1, 1935.         H. G. DAVIS         2,015,923
HOSE VALVE AND NOZZLE
Filed Oct. 19, 1934
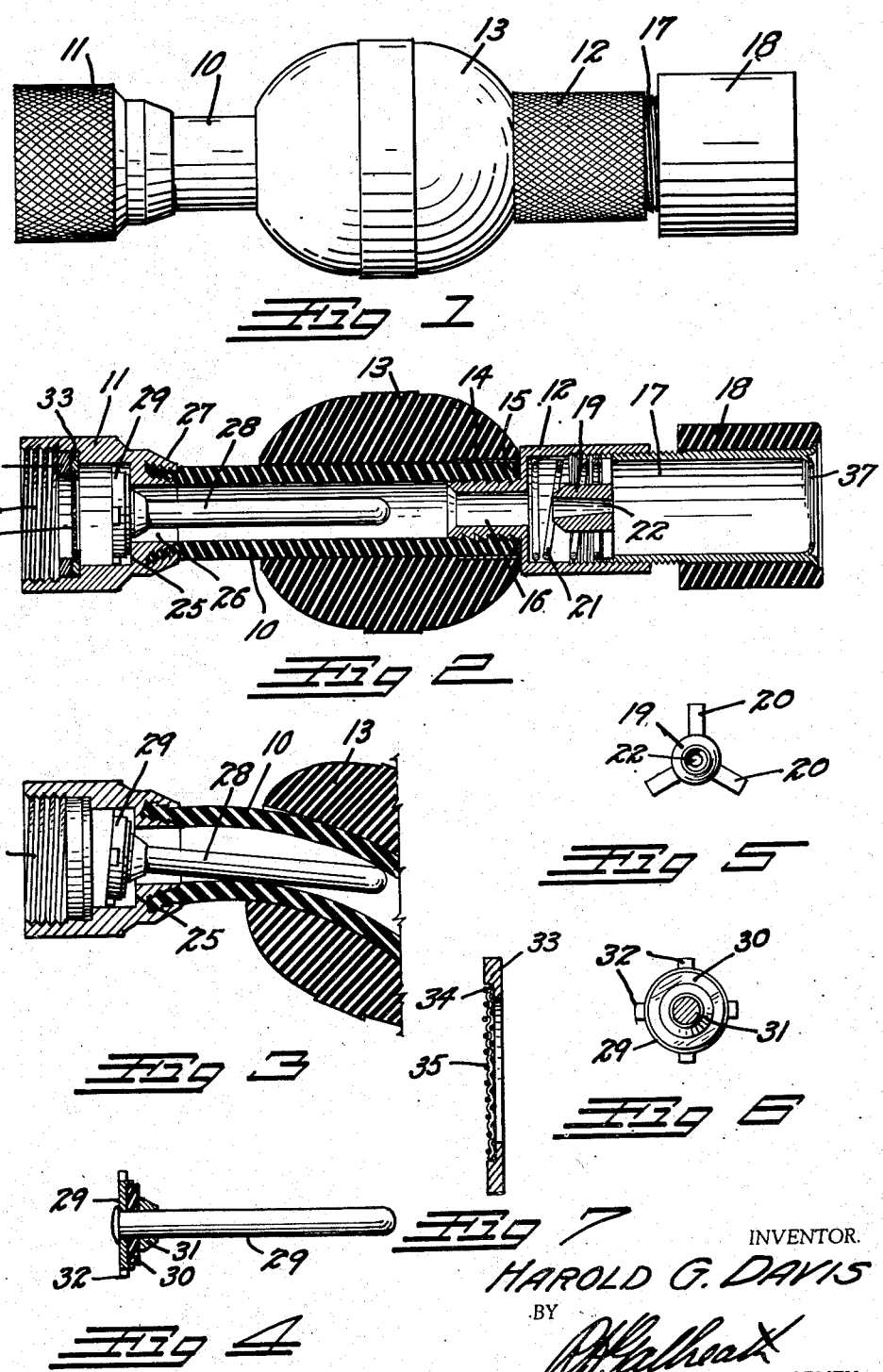
INVENTOR.
HAROLD G. DAVIS
BY
ATTORNEY.

Patented Oct. 1, 1935

2,015,923

UNITED STATES PATENT OFFICE 2,015,923

HOSE VALVE AND NOZZLE

Harold G. Davis, Denver, Colo.

Application October 19, 1934, Serial No. 749,061

13 Claims. (Cl. 299—149)

This invention relates to a combined hose valve and nozzle, more particularly designed for use in washing automobiles and the like. The principal object of the invention is to provide a combined hose nozzzle and valve by means of which the user can easily and continuously regulate the amount of flow through the nozzle to suit the particular work being done, and can also control the type of spray or stream being delivered by the nozzle. Thus, a hard strong stream can be delivered for washing mud and grease from the automobile chassis, or a soft slow stream can be delivered for sponging the more delicate finish of the automobile.

Other objects of the invention are to provide a simple, economical nozzle and valve construction which can be completely controlled by one hand allowing the other free for washing work; which will automatically shut off when not in use; which cannot become damaged by careless use; and which will not injure the finish of the automobile.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:—

Fig. 1 is a side elevation of the improved hose valve and nozzle.

Fig. 2 is a longitudinal section therethrough.

Fig. 3 is a fragmentary, similar section illustrating the valve in the open position.

Fig. 4 is a detail section through the valve member.

Fig. 5 is a face view of the nozzle controlling member.

Fig. 6 is an end view of the valve.

Fig. 7 is an enlarged section through the screen and screen frame.

The invention comprises: a relatively short piece of flexible hose 10, of rubber, fabric, or any other suitable material, on one extremity of which, a valve housing 11 is fixed. At the other extremity of the hose 10 a nozzle 12 is secured. Intermediate the extremities of the hose is a ball 13 of rubber or other suitable material. The ball 13 may be secured to the hose in any desired manner. As illustrated, it is molded onto a metallic sleeve 14 which is then clamped to the hose extremity and turned inwardly to form a flange 15 which holds the ball in place on the hose.

The nozzle 12 comprises a hollow cylindrical shell terminating at one extremity in a hose nipple 16. The nipple 16 is of smaller diameter than the shell and is permanently fixed into the extremity of the hose 10. The other extremity of the shell is internally threaded to receive a stream adjusting tube 17 which extends beyond the discharge extremity of the shell. The extending beyond portion of the tube 17 is enclosed in a protecting rubber sleeve 18. This sleeve 18 may be molded directly on the shell, and is preferably held in place thereon by splitting the extremity of the tube 17 and turning one-half of the split outwardly into the rubber of the sleeve and the other half inwardly to form a peripheral flange 37.

The tube 17 acts to hold in place a nozzle controlling member 19. The controlling member 19 is formed with spider-like projections 20 at one extremity which guide the member within the shell 12. The other extremity is beveled to form a tapered valve which can be forced into the open extremity of the hose nipple 16. A compression spring 21 constantly urges the member 19 outwardly and the threaded tube 17 is employed to force it inwardly. The controlling member 19 is formed with a conical water passage 22.

The valve housing 11 terminates in a threaded socket 23 for receiving the hose connector of any suitable supply hose. The interior of the housing is formed with a valve bore 24 of smaller diameter than the socket 23 terminating in a valve seat 25. A water passage 26 communicates between the valve bore 24, and the hose 10 through the valve seat 25. The valve housing is preferably secured to the hose by slipping the latter over an externally-toothed nipple 26, and then rolling or spinning an internally-toothed sleeve 27 thereover. In this way the hose is permanently secured to the metal of the housing 11.

The valve consists of a stem 28 which extends freely into the flexible hose 10. The stem 28 terminates in a cupped, valve disc 29, in which, a resilient washer 30 is held by means of a conical retaining ring 31. The valve disc 29 is formed with projecting tongues 32 which space it from the cylindrical interior of the valve bore 24. The valve is retained in the housing by means of a metallic retaining washer 33 provided with a shouldered recess 34 for receiving a fine mesh, metallic screen 35. The retaining washer 33 is held in place by means of a rubber hose gasket 55

36 which seals the joint to the supply hose connector.

Operation

In use, the valve housing 11 is secured on the extremity of the car washing hose. The pressure of the water supply presses against the valve disc 29 and firmly forces the washer 30 against its seat 25 so as to prevent water flowing through the valve. The user grasps the device by the ball 13, which provides a convenient and comfortable hand grip. A simple twist of the ball 13 to any side flexes the hose 10 and tilts the valve disc 29 from its seat 25, as shown in Fig. 3. This allows the water to flow between the tongues 32 and under the valve into the hose 10. The flow may be stopped by simply allowing the hose 10 to straighten so as to release the valve stem and allow the valve to return to its seat. The conical ring 31 acts to guide the valve to a concentric position on its seat.

If a hard stream is desired for heavy washing work, the tube 17 is rotated to force the control member 19 against the passage through the hose nipple 16. This allows the stream to be projected directly through the conical passage 22 and through the tube 17 in a small hard stream, without contacting the walls of the latter. Should a softer stream be desired, the tube 17 is rotated to allow the valve member 19 to separate from the nipple 16. The water can now flow both through and about the control member in a broken stream. This stream is still further broken by striking the peripheral flange 37 so that it exists in a harmless defused spray for supplying a sponge or similar uses. Any intermediate condition can be obtained by proper adjustment of the tube 17.

The screen 35 acts to prevent foreign materials from entering the valve, to defuse the incoming stream, and to prevent dripping or dribbling from the valve. The rubber sleeve 18 provides a convenient finger grip for adjusting the tube 17.

The spring 21, in addition to actuating the control member 19, acts to lock the tube 17 in its threads so that it will stay set at any desired position, regardless of where.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A combined hose valve and nozzle comprising: a relatively short length of flexible hose; a valve housing secured to one extremity of said hose; an internally threaded depression in said housing for receiving a supply coupling; a valve bore in said housing of smaller diameter than said depression; a water passage opening from said valve bore of smaller diameter than the latter; a valve seat between said bore and said passage; a valve disc positioned in said bore; a valve stem extending concentrically from said disc through said passage into said hose so that flexing of said hose will cause one side of said disc to move away from said valve seat while the other side contacts therewith.

2. A combined hose valve and nozzle comprising: a relatively short length of flexible hose; a valve housing secured to one extremity of said hose; an internally threaded depression in said housing for receiving a supply coupling; a valve bore in said housing of smaller diameter than said depression; a water passage opening from said valve bore of smaller diameter than the latter; a valve seat between said bore and said passage; a valve disc positioned in said bore; a valve stem extending concentrically from said disc through said passage into said hose so that flexing of said hose will cause one side of said disc to move away from said valve seat while the other side contacts therewith; and a sealing washer positioned between said disc and said valve seat and secured to the former.

3. A combined hose valve and nozzle comprising: a relatively short length of flexible hose; a valve housing secured to one extremity of said hose; an internally threaded depression in said housing for receiving a supply coupling; a valve bore in said housing of smaller diameter than said depression; a water passage opening from said valve bore of smaller diameter than the latter; a valve seat between said bore and said passage; a valve disc positioned in said bore; a valve stem extending concentrically from said disc through said passage into said hose so that flexing of said hose will cause one side of said disc to move away from said valve seat while the other side contacts therewith; and projections on said disc contacting the walls of said bore so as to maintain said disc substantially concentric with said valve seat.

4. A combined hose valve and nozzle comprising: a relatively short length of flexible hose; a valve housing secured to one extremity of said hose; an internally threaded depression in said housing for receiving a supply coupling; a valve bore in said housing of smaller diameter than said depression; a water passage opening from said valve bore of smaller diameter than the latter; a valve seat between said bore and said passage; a washer seat between said depression and said bore; a valve disc positioned in said bore; a valve stem extending concentrically from said disc through said passage into said hose so that flexing of said hose will cause one side of said disc to move away from said valve seat while the other side contacts therewith; a washer on said washer seat, the opening in said washer being smaller than said valve bore so as to hold said valve disc in place therein.

5. A combined hose valve and nozzle comprising: a relatively short length of flexible hose; a valve housing secured to one extremity of said hose; an internally threaded depression in said housing for receiving a supply coupling; a valve bore in said housing of smaller diameter than said depression; a water passage opening from said valve bore of smaller diameter than the latter; a valve seat between said bore and said passage; a washer seat between said depression and said bore; a valve disc positioned in said bore; a valve stem extending concentrically from said disc through said passage into said hose so that flexing of said hose will cause one side of said disc to move away from said valve seat while the other side contacts therewith; a metallic washer on said washer seat having a shouldered passage therethrough of smaller diameter than said valve bore; and a screen carried in said shouldered passage.

6. A combined hose valve and nozzle comprising: a relatively short length of flexible hose; a valve housing secured on the supply extremity of said hose; an internally threaded depression in said housing for receiving a supply coupling; a valve bore in said housing of smaller diameter than said depression; a water passage opening from said valve bore of smaller diameter than, and discharging from, the latter; a valve seat between said bore and said passage; a valve disc positioned in said bore; a valve stem extending concentrically from said disc through said passage into said hose so that flexing of said hose will cause one side of said disc to move away from said valve seat while the other side contacts therewith, said hose fitting over an externally toothed nipple on said housing; and an internally toothed sleeve on said housing clamping said hose against said nipple.

7. A hose nozzle comprising: a nozzle shell; means for securing one extremity of said shell to a source of supply; a supply passage extending into said shell, the internal diameter of said shell being greater than said supply passage; a tube threaded into said shell opposite said water passage; a control member positioned between said tube and said water passage so that said tube may force said control member into contact with said supply passage when desired; an inwardly extending flange about the discharge extremity of said tube to break and defuse water flowing therefrom.

8. A hose nozzle comprising: a nozzle shell; means for securing one extremity of said shell to a source of supply; a supply passage extending into said shell, the internal diameter of said shell being greater than said supply passage; a tube threaded into said shell opposite said water passage; a control member positioned between said tube and said water passage so that said tube may force said control member into contact with said supply passage when desired; a resilient rubber sleeve surrounding the projecting portion of said tube to protect the latter from external contacts.

9. A combined hose valve and nozzle comprising: a relatively short piece of flexible hose; a valve housing secured on the supply extremity of said hose; means for securing said valve housing to a source of supply; a tiltable valve in said valve housing; a stem extending from said valve into said hose in the direction of flow therein so that flexing of the latter will tilt said valve; a nozzle shell secured on the other extremity of said hose; means in said nozzle shell for controlling the character of the stream issuing therefrom; and a ball secured on said hose to provide a convenient hand grip for flexing the latter.

10. A combined hose valve and nozzle comprising: a relatively short length of flexible hose; a water dispersing member secured on the discharge extremity of said hose; a valve housing secured on the supply extremity of said hose; a valve in said housing; a stem extending from said valve in the direction of flow into said hose so that flexing of said hose will actuate said valve; and means for securing said valve housing to a source of supply.

11. A flexible hose nozzle comprising: a relatively short flexible tube; a valve at the feed end of said tube controlled by flexing the latter; a nozzle shell at the discharge end of said tube, said shell having an open discharge extremity and a water passage communicating with said flexible tube; a relatively short tube threaded into the discharge extremity of said shell; and a stream control member slidably mounted in said shell between said passage and said tube, so that as said tube is threaded into said shell it will force said control member toward said water passage.

12. A flexible hose nozzle comprising: a relatively short flexible tube; a valve at the feed end of said tube controlled by flexing the latter; a nozzle shell at the discharge end of said tube, said shell having an open discharge extremity and a water passage communicating with said flexible tube; a relatively short tube threaded into the discharge extremity of said shell; and a stream control member slidably mounted in said shell between said passage and said tube; arms extending from said control member into sliding contact with the inner wall of said shell to maintain said control member concentric therein, said arms being contacted by said tube so as to force said control member toward said water passage when said tube is threaded into said shell.

13. A flexible hose nozzle comprising: a relatively short flexible tube; a valve at the feed end of said tube controlled by flexing the latter; a nozzle shell at the discharge end of said tube, said shell having an open discharge extremity and a water passage communicating with said flexible tube; a relatively short tube threaded into the discharge extremity of said shell; a steam control member slidably mounted in said shell between said passage and said tube, so that as said tube is threaded into said shell it will force said control member toward said water passage; a shoulder in said shell about said water passage; and a spring positioned between said shoulder and said arms to urge said control member away from said passage.

HAROLD G. DAVIS.